United States Patent
Supanekar

(10) Patent No.: US 12,048,034 B2
(45) Date of Patent: Jul. 23, 2024

(54) SON ASSISTED RAT SELECTION FOR UE IN A VIRTUALIZED RAN ENVIRONMENT

(71) Applicant: Parallel Wireless, Inc., Nashua, NH (US)

(72) Inventor: Ketan Supanekar, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 111 days.

(21) Appl. No.: 16/995,354

(22) Filed: Aug. 17, 2020

(65) Prior Publication Data

US 2021/0051745 A1 Feb. 18, 2021

Related U.S. Application Data

(60) Provisional application No. 62/887,968, filed on Aug. 16, 2019.

(51) Int. Cl.
*H04W 76/15* (2018.01)
*H04W 24/02* (2009.01)
*H04W 36/14* (2009.01)
*H04W 76/27* (2018.01)
*H04W 84/18* (2009.01)

(52) U.S. Cl.
CPC ........... *H04W 76/15* (2018.02); *H04W 24/02* (2013.01); *H04W 36/14* (2013.01); *H04W 76/27* (2018.02); *H04W 84/18* (2013.01)

(58) Field of Classification Search
CPC ..... H04W 76/15; H04W 24/02; H04W 36/14; H04W 76/27; H04W 84/18
See application file for complete search history.

(56) References Cited

U.S. PATENT DOCUMENTS

| | | |
|---|---|---|
| 2015/0215832 A1 | 7/2015 | Fitzpatrick |
| 2016/0277992 A1* | 9/2016 | Cao ................. H04W 48/18 |
| 2017/0273134 A1* | 9/2017 | Cao ................. H04W 76/27 |
| 2018/0249426 A1 | 8/2018 | Mrozinski |
| 2020/0045565 A1 | 2/2020 | Tanna et al. |
| 2020/0084711 A1 | 3/2020 | Liu et al. |
| 2020/0107257 A1 | 4/2020 | Ke et al. |
| 2020/0351732 A1* | 11/2020 | Mwanje ............ H04W 24/10 |
| 2021/0076259 A1 | 3/2021 | Mishra et al. |

* cited by examiner

*Primary Examiner* — Ricky Q Ngo
*Assistant Examiner* — Stephen N Steiner
(74) *Attorney, Agent, or Firm* — Michael Y. Saji

(57) ABSTRACT

Systems, methods and computer software are disclosed for a Self Organizing Network (SON) Radio Access Technology (RAT) selection for User Equipment (UE) in a virtualized Radio Access Network (RAN) environment. In one embodiment, a method is disclosed, comprising: establishing, by the UE, a Signaling Radio Bearer (SRB) and at least one Data Radio Bearer (DRB) with a Virtual node (Vnode); determining, by the SON, whether the Vnode has reached a data saturation limit; when the Vnode has reached the data saturation limit, then determining whether there is another RAT Vnode which can provide better data throughput; and when there is another RAT Vnode which can provide better data throughput, then initiating a handover procedure for the UE and specifying a target cell located in a same geographic area.

18 Claims, 9 Drawing Sheets

SON ASSISTED RAT SELECTION FOR UE IN A VIRTUALIZED RAN ENVIRONMENT

CROSS-REFERENCE TO RELATED APPLICATIONS

This application claims priority under 35 U.S.C. § 119(e) to U.S. Provisional Pat. App. No. 62/887,968, filed Aug. 16, 2019, titled "SON Assisted RAT Selection for UE in a Virtualized RAN Environment" which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

In a virtualized multi Radio Access Technology (RAT) radio network there is cloud computing component which virtualizes the radio network controllers under it by aggregating and proxying their core network signaling. It also proxies data streams coming from these multi RAT nodes.

2G cloud RAN runs a virtualized node VPCU, 3G cloud RAN runs a virtualized node VRNC, 4G cloud RAN runs a virtualized node VENB. The virtualized nodes have capacity limits in terms of number of UE's which can be served by them while maintaining acceptable levels of quality Of Service (QOS). QOS is often measured as Up Load/down Load (UL/DL) data rate for PS domain.

These virtualized nodes run as part of cloud-based RAN virtualization platform which spawns and manages these virtual nodes. The RAN virtualization platform (e.g. PW HNG) has visibility into KPI's of these devices.

SUMMARY

Consider a geographic area receiving coverage from Multi-RAT nodes (CWS). In this situation the default settings might dictate modern smartphone-based UE to connect to 5G network which will provide better UL/DL speeds theoretically as compared to any other network.

However, the assumption that 5G network is the best network to connect to might not be accurate in a virtualized RAN environment as the virtual node might be approaching data throughput saturation limits and its bearer may not provide the best UL/DL throughput in that case. At the same time a different RAT virtual node might have enough data throughput capacity and is able to provide better throughput to UE using its bearer.

A method for SON assisted RAT selection for UE in a virtualized RAN environment is described. In one embodiment the method for Self Organizing Network (SON) Radio Access Technology (RAT) selection for User Equipment (UE) in a virtualized Radio Access Network (RAN) environment includes establishing, by the UE, a Signaling Radio Bearer (SRB) and at least one Data Radio Bearer (DRB) with Virtual node (Vnode). The method also includes determining, by the SON, whether the Vnode has reached a data saturation limit, and when the Vnode has reached the data saturation limit, then determining whether there is another RAT Vnode which can provide better data throughput. When there is another RAT Vnode which can provide better data throughput, then initiating a handover procedure for the UE and specifying a target cell located in a same geographic area.

DETAILED DESCRIPTION

Figure 1:
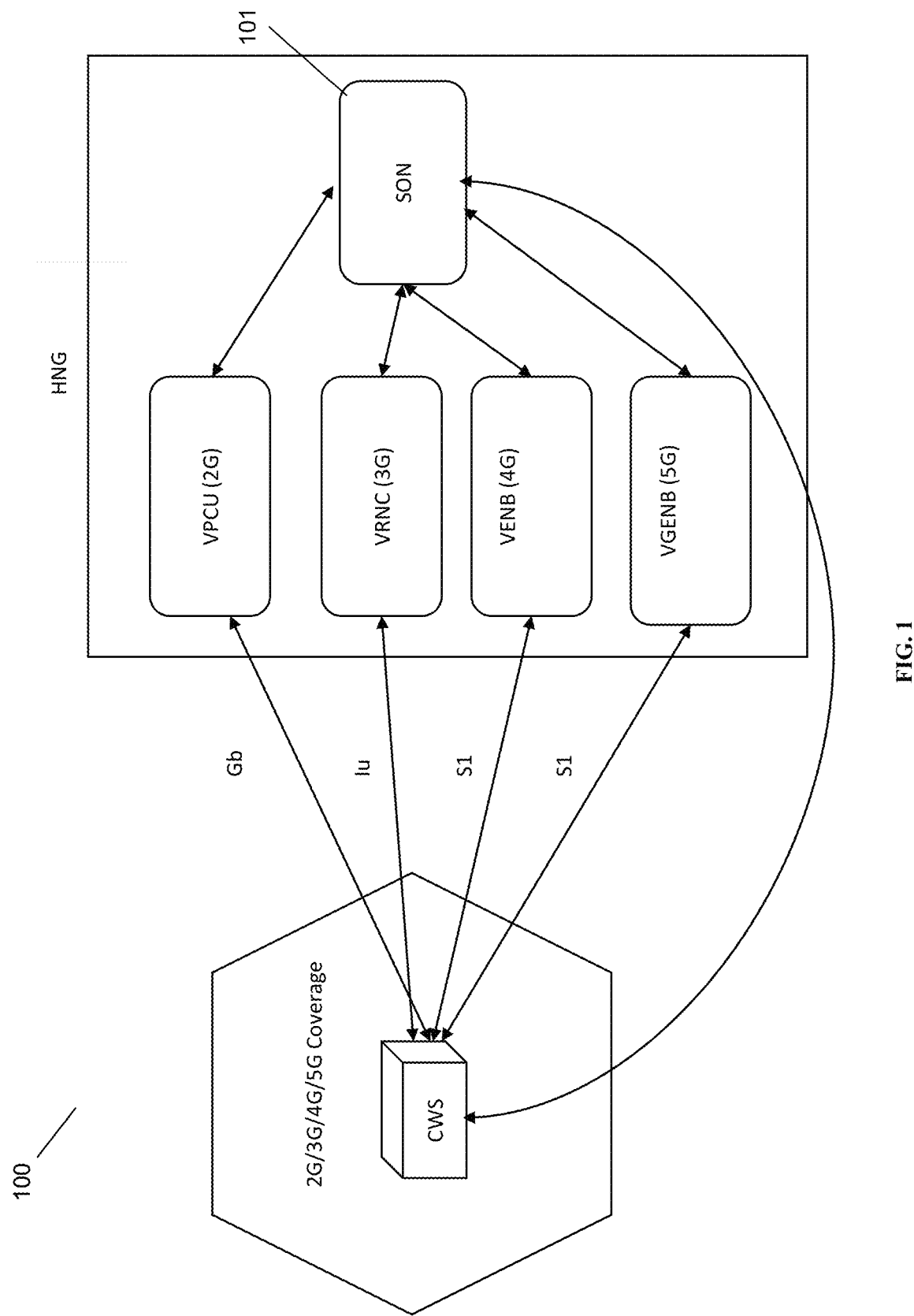
FIG. 1 is a system diagram showing components of a virtualized Multi-RAT network, in accordance with some embodiments.

Referring to FIG. 1, a Virtual Node (Vnode), sometimes referred to as a HetNet Gateway (HNG) 100 is shown. The Vnode 100 includes a Self Organizing Network (SON) module 101 running on HNG to detect data throughput saturation inside Virtual node with which incoming UE has established Signaling Radio Bearer (SRB) and Data Radio Bearer (DRB) and to initiate a Handover Procedure from current RAT Vnode for this UE to different RAT Vnode running on this HNG which can provide better overall UL/DL throughput.

Detection by SON

Inside HNG, SON is an OAM module responsible for node configuration, Key Performance Indicators (KPI) monitoring and stats collection. SON has global view of the coverage area of CWS cells and their KPI's as well as KPI's of virtual nodes running on HNG.

SON can detect when UE connected to certain CWS RAT cell (say r1) also receives coverage from different CWS RAT cell (say r2) in certain geographic area. This information can be based on either GEO neighbors built by SON or UE reported Inter-RAT neighbors sent to SON by the CWS cells.

When UE connects to certain RAT cell it establishes SRB and at least one DRB with associated RAT Vnode. SON comes to know of this event using triggers from said Vnode module. On receiving these triggers SON calculates if Vnode has necessary bandwidth available to satisfy bearer throughput requirements for that RAT. If not, SON triggers Vnode module to perform handover to different RAT cell in same geographic area, which is virtualized by different Vnode and has adequate capacity to give better throughput to UE.

Role of VNode

On receiving trigger from SON module to initiate handover to different SON managed RAT cell, Vnode sends to core network a Handover required message having identification of the target SON managed RAT cell. Core network entities of two RAT systems involved perform further signaling to prepare resources at the target RAT cell for UE to latch onto. Once resources are setup at target cell, core sends a Handover Command to Vnode which forwards same to source multi RAT cell.

Role of UE

UE should switch to RAT cell whose identification information is provided in a Handover Command message. At UE when radio link configuration is complete a notification is sent to Vnode (NAS signaling) to complete the core side signaling procedures.

Once the core side signaling completes UE can access data using RAT which is more optimal under given circumstances for said geographic area.

Figure 2:
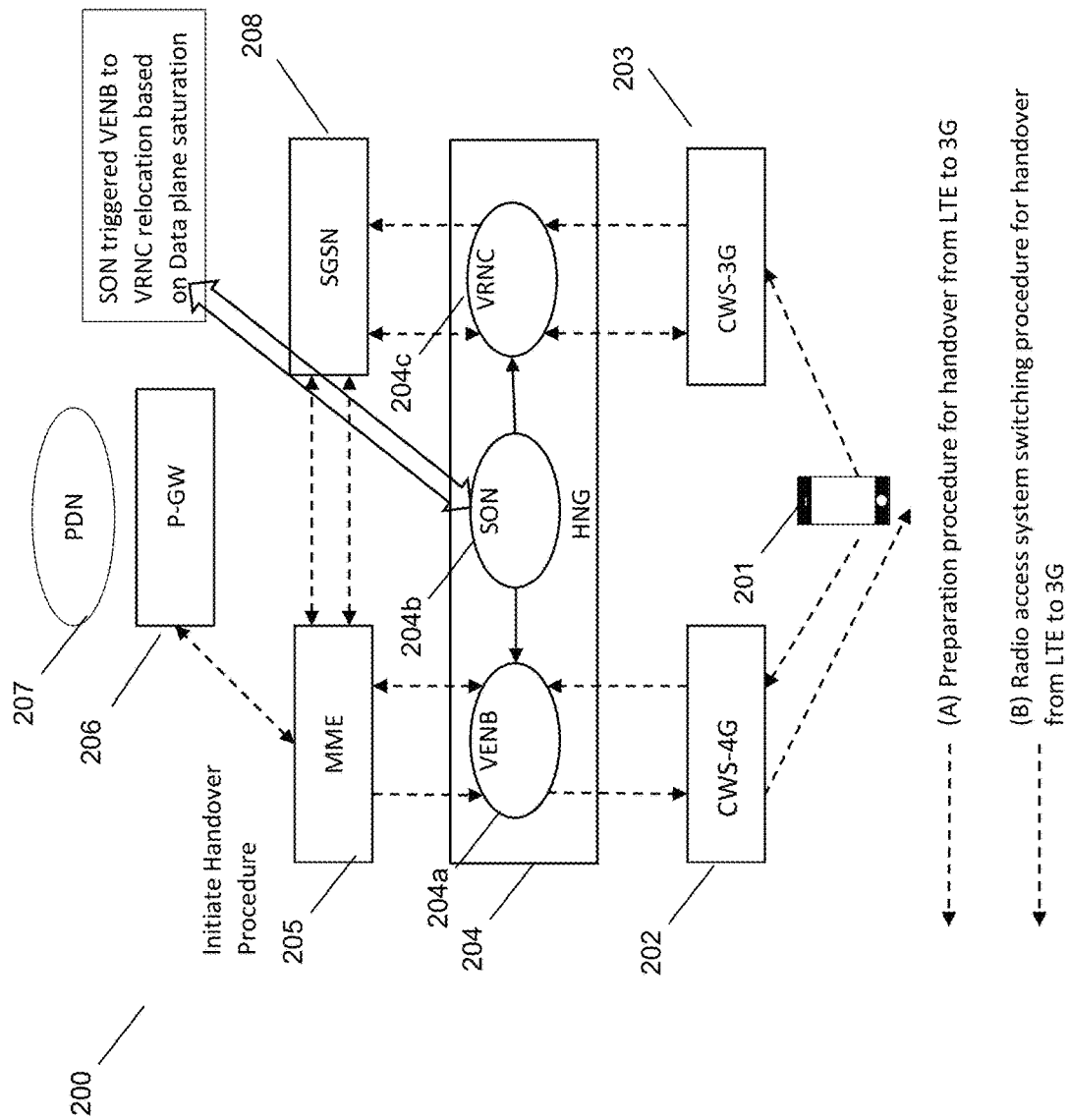
FIG. 2 is a diagram showing a switching procedure during handover, in accordance with some embodiments.

FIG. 2 is a diagram of a system 200 and shows a User Equipment (UE) 201 in communication with a 4G Converged Wireless System (CWS) 202 and also with a 3G CWS 203. Also shown is a Vnode 204 including a Virtual eNodeB (VENB) 204*a*, a Self Organizing Network (SON) 204*b* and a Virtual Radio Network Controller (VRNC) 204*c* as well as a Mobility Management Entity (MME) 205, a Packet Gateway (P-GW) 206 a Packet Data Network (PDN) 207 and a Serving GPRS Support Node (SGSN) 208. Wherever a Converged Wireless System (CWS) is shown or described herein, a multi-RAT base station is understood to be contemplated. Depicted is an overview of a handover from LTE to 3G, in particular the switching procedure during handover. Both RATs CWS-4G 202 and CWS-3G 203 are managed by HNG 204. SON 204*b* manages both virtual network functions 204*a* and 204*c*. The initiate handover procedure is initiated by SON 204*b* when the 4G DRB is saturated. SON 204*b* communicates to VENB 204*a*, which coordinates the handover with UE 201 via CWS-4G 202, sending a network-initiated handover message, and with other network nodes as appropriate. When handover is requested and communication occurs between PGW 206 and MME 205 to initiate the handover, the MME 205 communicates with vENB 204*a*, which is part of HNG 204. It is understood that the same method is applicable for 3G to 4G handover or handover from any RAT to any other RAT.

Figure 3:
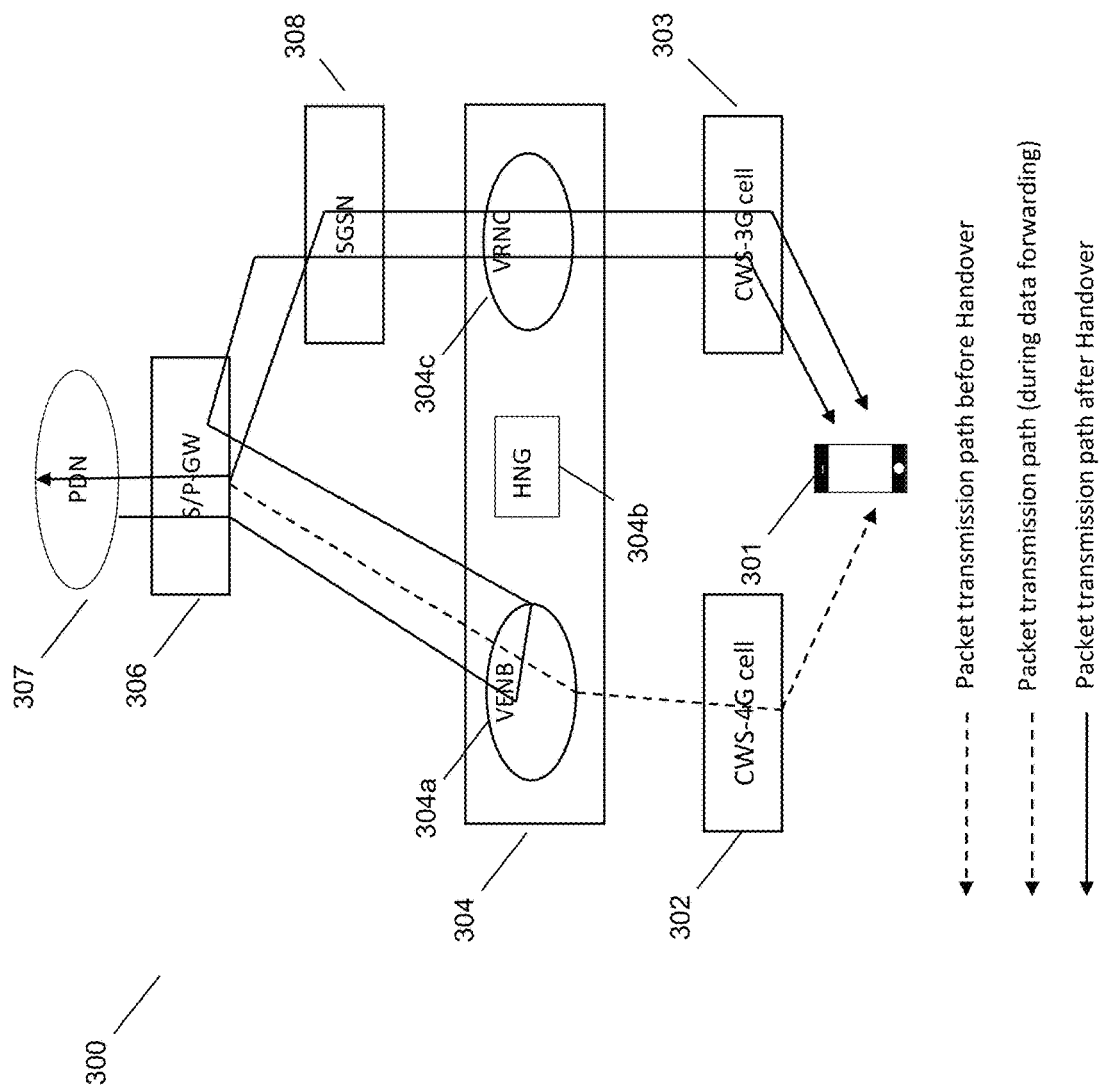
FIG. 3 is a diagram showing packet transmission paths during handover, in accordance with some embodiments.

FIG. 3 shows a User Equipment (UE) 301 in communication with a 4G CWS cell 302202 and also with a 3G CWS cell 303. Also shown is a Vnode 304 including a Virtual eNodeB (VENB) 304*a*, n HNG 304B and a Virtual Radio Network Controller (VRNC) 304*c* as well as P-GW 306, PDN 307 and SGSN) 308. Depicted is the packet transmission path during handover. Prior to handover, packets pass through VENB 304*a* and the 4G radio access network (RAN) 302, and then to the UE 301. During handover, LTE data is forwarded from gateway 306 and VENB 304*a*, back to gateway 306, through SGSN 308 and VRNC 304*c*, and through 3G RAN 303. In some embodiments it is contemplated that this data can be forwarded at the HNG 304 without going back up to gateway 306. During and subsequent to handover, 3G data is passed through SGSN 308, VRNC 304*c*, and 3G RAN 303 to the UE. It is understood that the same method is applicable for 3G to 4G handover or handover from any RAT to any other RAT.

Figure 4:
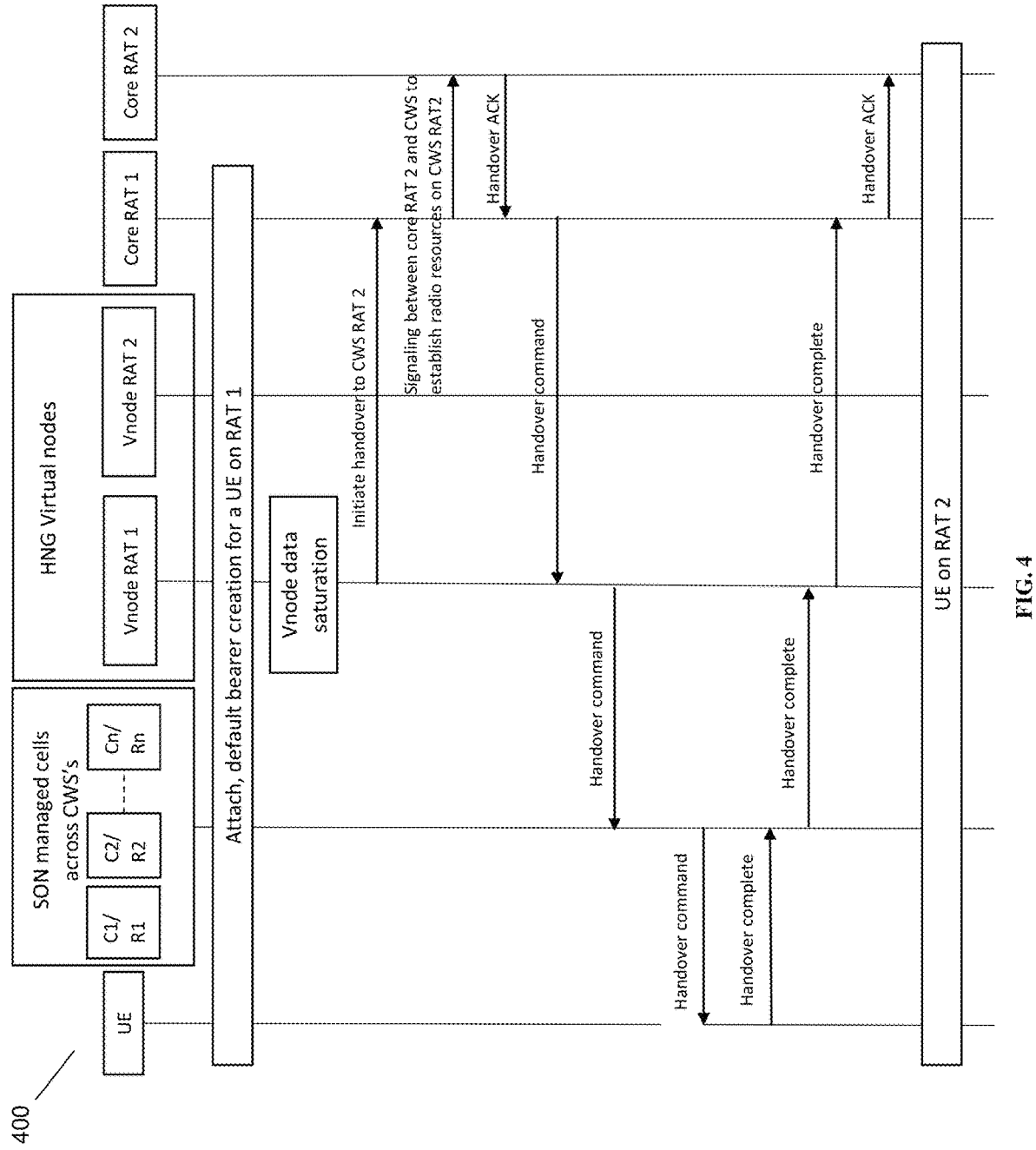
FIG. 4 is a call flow, in accordance with some embodiments.

FIG. 4 is a diagram of a call flow 400 for a handover. Multiple RAT cells are managed at at a single SON node. The HNG also manages virtual nodes that are logically situated in the core, and are logically located closer to the core network; the HNG may host these nodes on the same machine as virtual machines and internal network connections may be used to connect the virtual machines. At a first step, attach and default bearer creation is performed for a UE on RAT 1. When RAT 1 is saturated, the Vnode virtual controller for RAT 1 sends a message to the core to initiate handover. Signaling occurs in the core between core nodes for RAT 1 and RAT 2 to set up the handover, and once handover is provisioned, the handover is acknowledged and appropriate messages are sent over to the RAT 1 and RAT 2 RAN nodes and to the UE to complete the handover.

Figure 5:
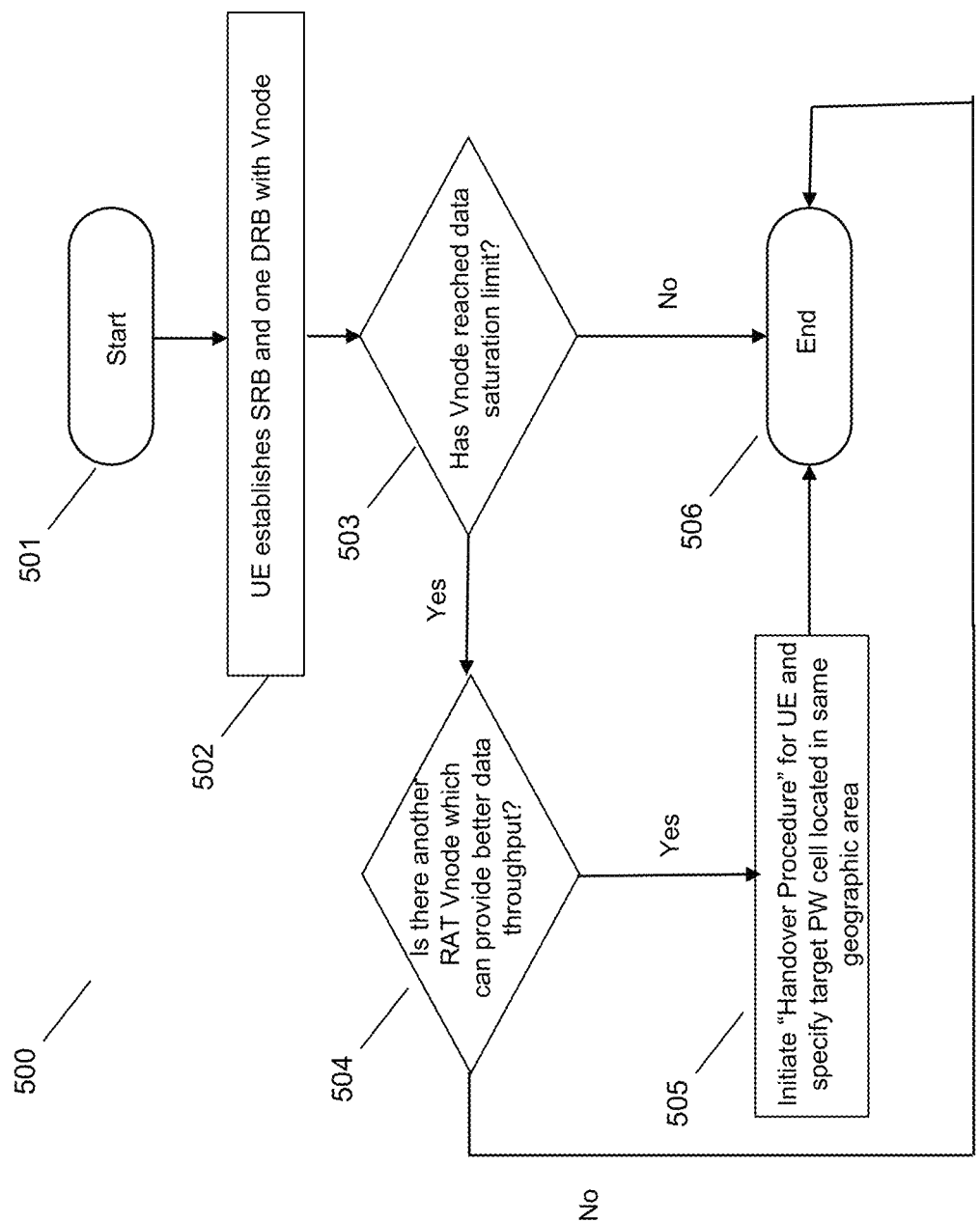
FIG. 5 is a flow diagram showing RAT reselection flow, in accordance with some embodiments.

FIG. 5 is a RAT reselection flow diagram. The process 500 starts at processing block 501 and proceeds to processing block 502 where the UE establishes an SRB and a DRB with the vNode. A determination is made at decision block 503 regarding whether the vNode has reached a data saturation limit. When the Vnode has reached the data saturation limit, then a determination is made at decision block 504 whether there is another Rat Vnode which can provide better data throughput. When the determination is made that there is another Rat Vnode that can provide better data throughput, then processing block 505 is performed wherein a handover procedure for the UE and specifying of the target PW cell located in a same geographic area is performed. The process then ends as shown at processing block 506.

When the determination at decision block 503 is that the Vnode has not reached the data saturation limit, the process then ends as shown at processing block 506. Similarly, when the determination at decision block 504 is that there is not another Rat Vnode that can provide better data throughput, the process then ends as shown at processing block 506.

Figure 6:
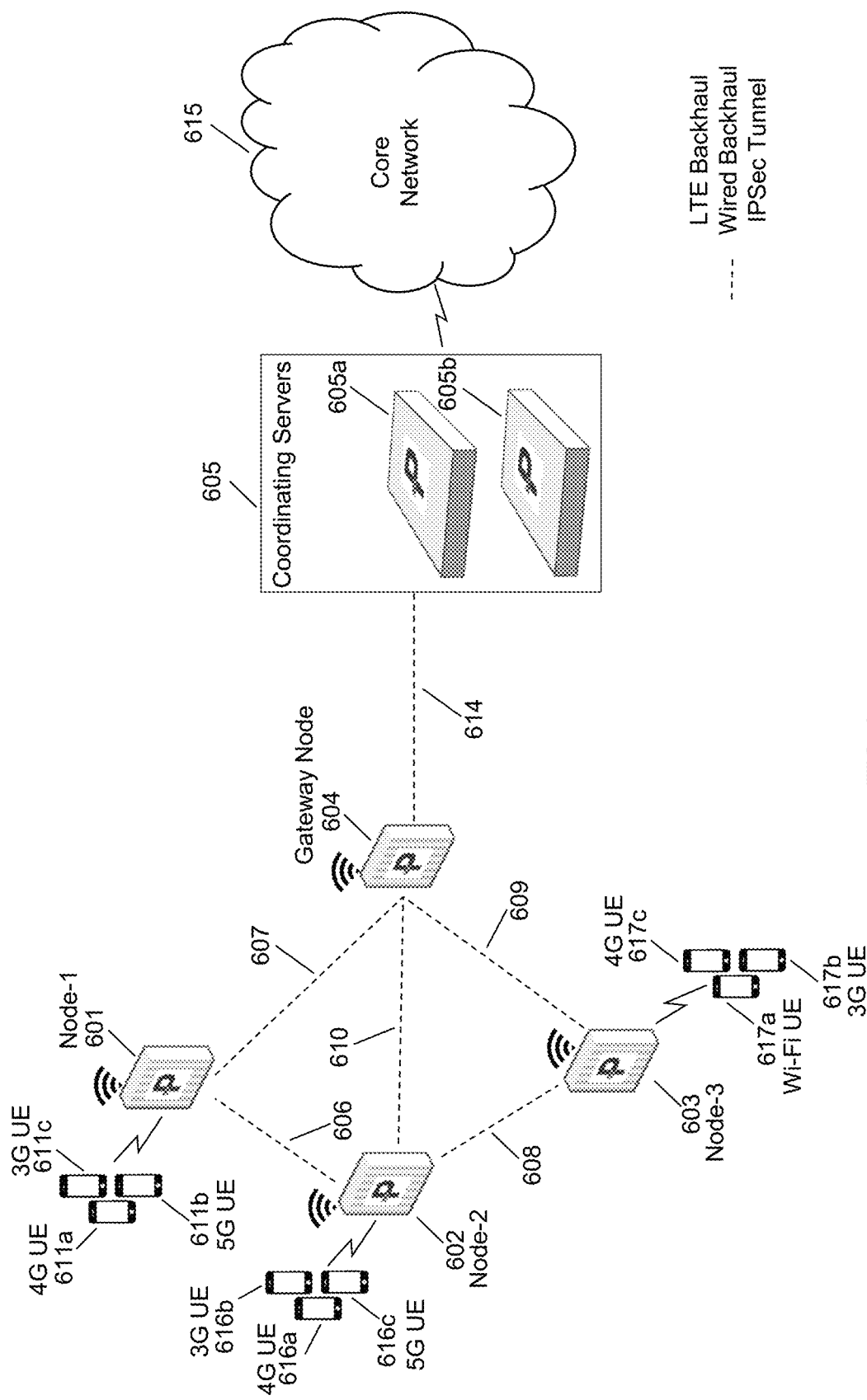
FIG. 6 is a network diagram, in accordance with some embodiments.

FIG. 6 is a network diagram in accordance with some embodiments. In some embodiments, as shown in FIG. 6, a mesh node 1 601, a mesh node 2 602, and a mesh node 3 603 are any G RAN nodes. Base stations 601, 602, and 603 form a mesh network establishing mesh network links 606, 607, 608, 609, and 610 with a base station 604. The mesh network links are flexible and are used by the mesh nodes to route traffic around congestion within the mesh network as needed. The base station 604 acts as gateway node or mesh gateway node, and provides backhaul connectivity to a core network to the base stations 601, 602, and 603 over backhaul link 614 to a coordinating server(s) 605 and towards core network 615. The Base stations 601, 602, 603, 604 may also provide eNodeB, NodeB, Wi-Fi Access Point, Femto Base Station etc. functionality, and may support radio access technologies such as 2G, 3G, 4G, 5G, Wi-Fi etc. The base stations 601, 602, 603 may also be known as mesh network nodes 601, 602, 603.

The coordinating servers 605 are shown as two coordinating servers 605a and 605b. The coordinating servers 605a and 605b may be in load-sharing mode or may be in active-standby mode for high availability. The coordinating servers 605 may be located between a radio access network (RAN) and the core network and may appear as core network to the base stations in a radio access network (RAN) and a single eNodeB to the core network, i.e., may provide virtualization of the base stations towards the core network. As shown in FIG. 6, various user equipments 611a, 611b, 611c are connected to the base station 601. The base station 601 provides backhaul connectivity to the user equipments 611a, 611b, and 611c connected to it over mesh network links 606, 607, 608, 609, 610 and 614. The user equipments may be mobile devices, mobile phones, personal digital assistant (PDA), tablet, laptop etc. The base station 602 provides backhaul connection to user equipments 612a, 612b, 612c and the base station 603 provides backhaul connection to user equipments 613a, 613b, and 613c. The user equipments 611a, 611b, 611c, 612a, 612b, 612c, 613a, 613b, 613c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 611a, 611b, 611c, 612a, 612b, 612c, 613a, 613b, and 613c, the uplink 614 may get congested under certain circumstances. As described above, to continue the radio access network running and providing services to the user equipments, the solution requires prioritizing or classifying the traffic based at the base stations 601, 602, 603. The traffic from the base stations 601, 602, and 603 to the core network 615 through the coordinating server 605 flows through an IPSec tunnel terminated at the coordinating server 605. The mesh network nodes 601, 602, and 603 adds IP Option header field to the outermost IP Header (i.e., not to the pre-encapsulated packets). The traffic may from the base station 601 may follow any of the mesh network link path such as 607, 606-110, 606-108-109 to reach to the mesh gateway node 604, according to a mesh network routing protocol.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

Figure 7:
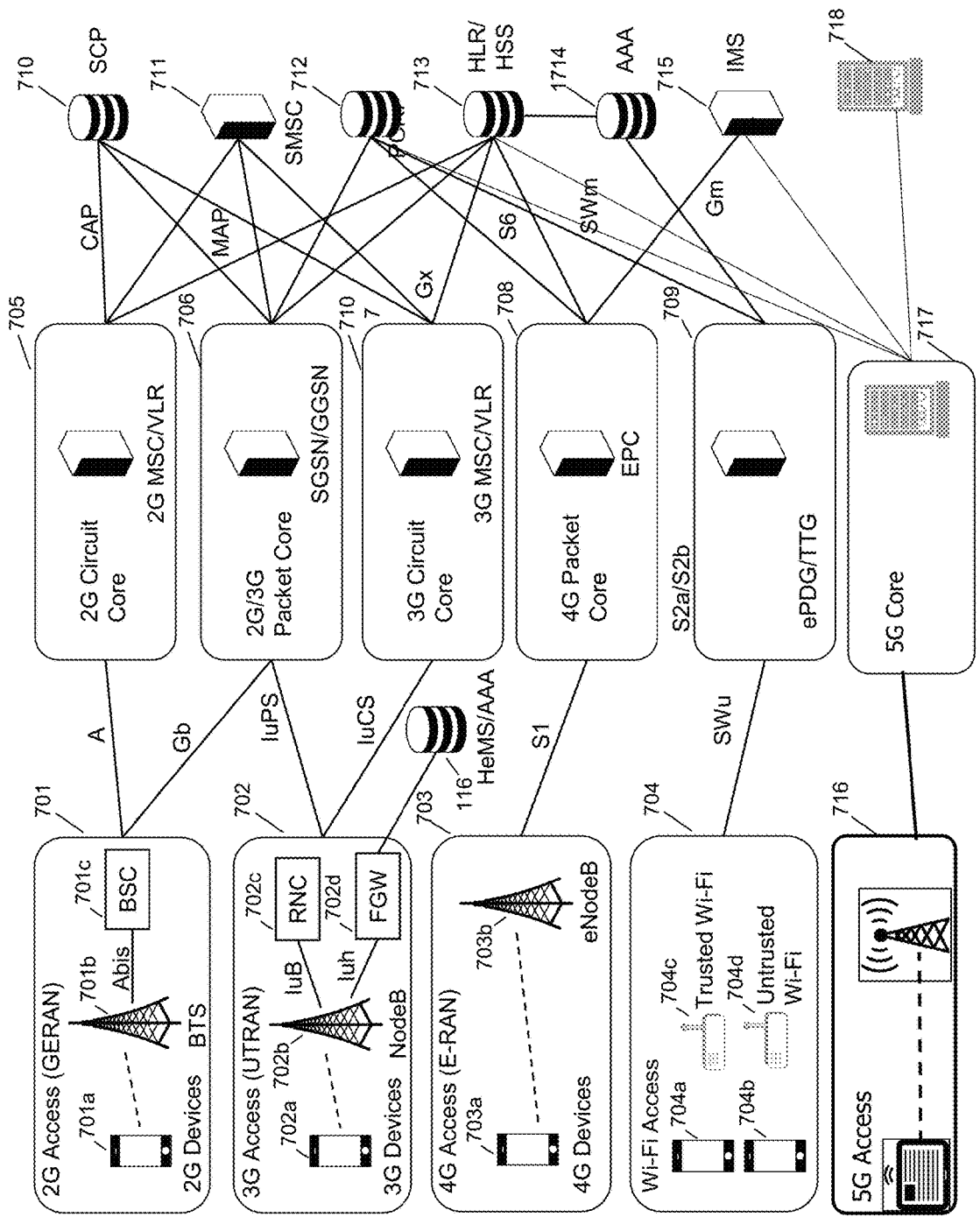
FIG. 7 is a schematic network architecture diagram for 3G and other-G prior art networks, in accordance with some embodiments.

Shown in FIG. 7 is a schematic network architecture diagram for 3G and other-G prior art networks. The diagram shows a plurality of "Gs," including 2G, 3G, 4G, 5G and Wi-Fi. 2G is represented by GERAN 701, which includes a 2G device 701a, BTS 701b, and BSC 701c. 3G is represented by UTRAN 702, which includes a 3G UE 702a, nodeB 702b, RNC 702c, and femto gateway (FGW, which in 3GPP namespace is also known as a Home nodeB Gateway or HNBGW) 702d. 4G is represented by EUTRAN or E-RAN 703, which includes an LTE UE 703a and LTE eNodeB 703b. Wi-Fi is represented by Wi-Fi access network 704, which includes a trusted Wi-Fi access point 704c and an untrusted Wi-Fi access point 704d. The Wi-Fi devices 704a and 704b may access either AP 704c or 704d. In the current network architecture, each "G" has a core network. 2G circuit core network 705 includes a 2G MSC/VLR; 2G/3G packet core network 706 includes an SGSN/GGSN (for EDGE or UMTS packet traffic); 3G circuit core 707 includes a 3G MSC/VLR; 4G circuit core 708 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 730, the SMSC 731, PCRF 732, HLR/HSS 733, Authentication, Authorization, and Accounting server (AAA) 734, and IP Multimedia Subsystem (IMS) 735. An HeMS/AAA 736 is present in some cases for use by the 3G UTRAN. The diagram is used to indicate schematically the basic functions of each network as known to one of skill in the art, and is not intended to be exhaustive. For example, 5G core 717 is shown using a single interface to 5G access 716, although in some cases 5G access can be supported using dual connectivity or via a non-standalone deployment architecture.

Noteworthy is that the RANs 701, 702, 703, 704 and 736 rely on specialized core networks 705, 706, 707, 708, 709, 737 but share essential management databases 730, 731, 732, 733, 734, 735, 738. More specifically, for the 2G GERAN, a BSC 701c is required for Abis compatibility with BTS 701b, while for the 3G UTRAN, an RNC 702c is required for Iub compatibility and an FGW 702d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 8:
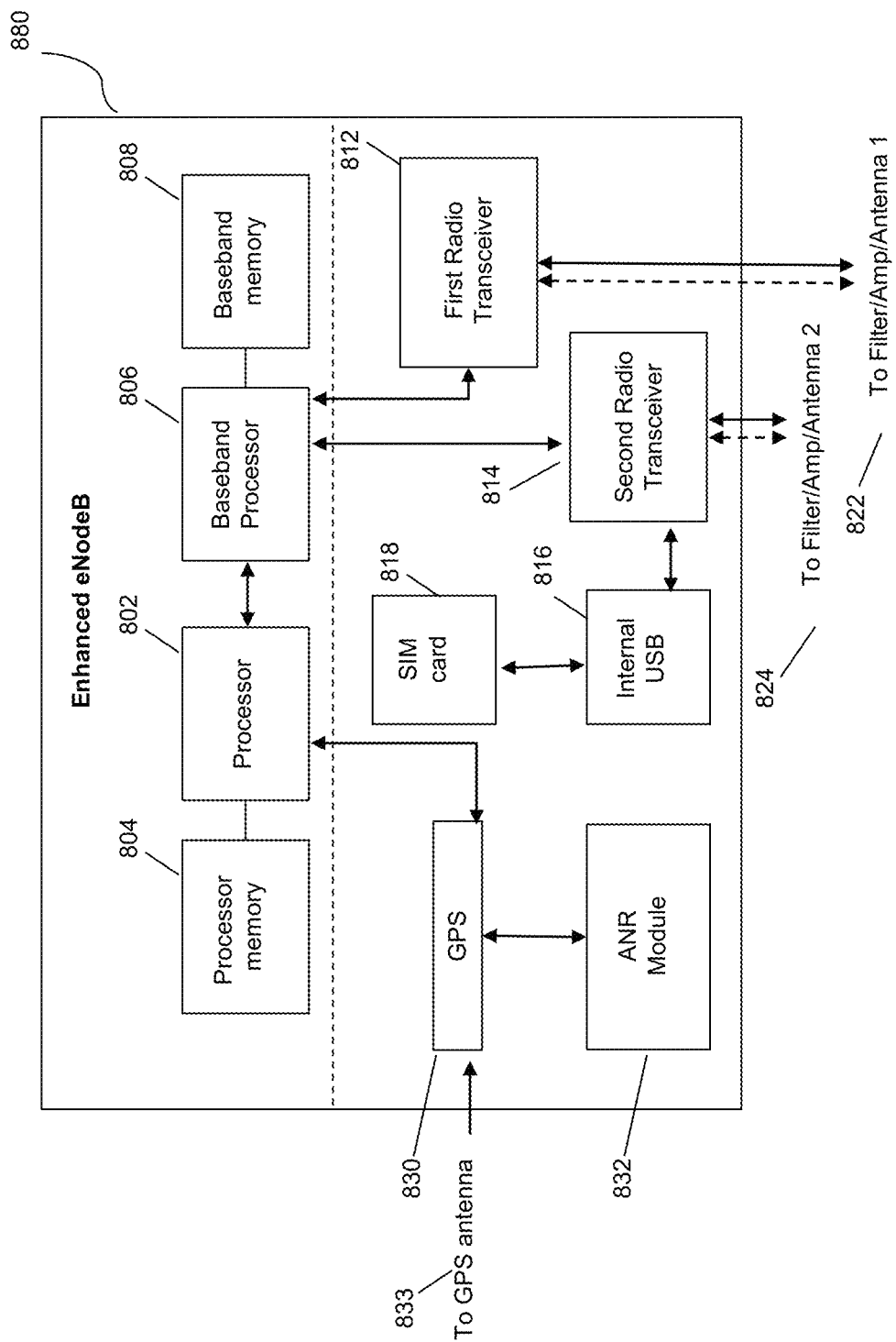
FIG. 8 is an enhanced eNodeB for performing the methods described herein, in accordance with some embodiments.

FIG. 8 shows is an enhanced eNodeB for performing the methods described herein, in accordance with some embodiments. eNodeB 800 may include processor 802, processor memory 804 in communication with the processor, baseband processor 806, and baseband processor memory 808 in communication with the baseband processor. Mesh network node 800 may also include first radio transceiver 812 and second radio transceiver 814, internal universal serial bus (USB) port 816, and subscriber information module card (SIM card) 818 coupled to USB port 816. In some embodiments, the second radio transceiver 814 itself may be coupled to USB port 816, and communications from the baseband processor may be passed through USB port 816. The second radio transceiver may be used for wirelessly backhauling eNodeB 800.

Processor 802 and baseband processor 806 are in communication with one another. Processor 802 may perform routing functions, and may determine if/when a switch in network configuration is needed. Baseband processor 806 may generate and receive radio signals for both radio transceivers 812 and 814, based on instructions from processor 802. In some embodiments, processors 802 and 806 may be on the same physical logic board. In other embodiments, they may be on separate logic boards.

Processor 802 may identify the appropriate network configuration, and may perform routing of packets from one network interface to another accordingly. Processor 802 may use memory 804, in particular to store a routing table to be used for routing packets. Baseband processor 806 may perform operations to generate the radio frequency signals for transmission or retransmission by both transceivers 810 and 812. Baseband processor 806 may also perform operations to decode signals received by transceivers 812 and 814. Baseband processor 806 may use memory 808 to perform these tasks.

The first radio transceiver 812 may be a radio transceiver capable of providing LTE eNodeB functionality, and may be capable of higher power and multi-channel OFDMA. The second radio transceiver 814 may be a radio transceiver capable of providing LTE UE functionality. Both transceivers 812 and 814 may be capable of receiving and transmitting on one or more LTE bands. In some embodiments, either or both of transceivers 812 and 814 may be capable of providing both LTE eNodeB and LTE UE functionality. Transceiver 812 may be coupled to processor 802 via a Peripheral Component Interconnect-Express (PCI-E) bus, and/or via a daughtercard. As transceiver 814 is for providing LTE UE functionality, in effect emulating a user equipment, it may be connected via the same or different PCI-E bus, or by a USB bus, and may also be coupled to SIM card 818. First transceiver 812 may be coupled to first radio frequency (RF) chain (filter, amplifier, antenna) 822, and second transceiver 814 may be coupled to second RF chain (filter, amplifier, antenna) 824.

SIM card 818 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 800 is not an ordinary UE but instead is a special UE for providing backhaul to device 800.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 812 and 814, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 802 for reconfiguration.

A GPS module 830 may also be included, and may be in communication with a GPS antenna 832 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 832 may also be present and may run on processor 802 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 9:
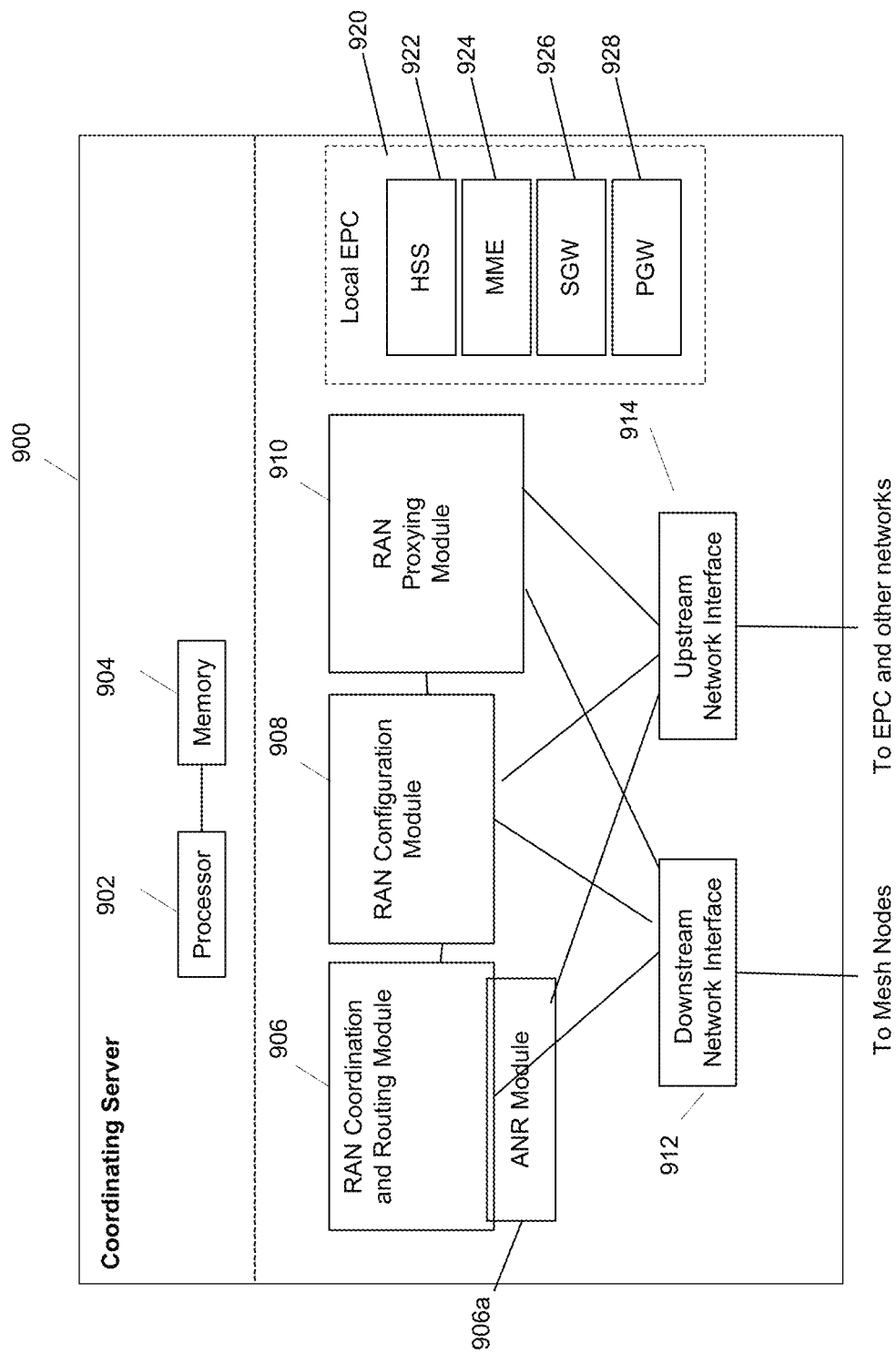
FIG. 9 is a coordinating server for providing services and performing methods as described herein, in accordance with some embodiments.

Shown in FIG. 9 is a coordinating server for providing services and performing methods as described herein, in accordance with some embodiments. Coordinating server 900 includes processor 902 and memory 904, which are configured to provide the functions described herein. Also present are radio access network coordination/routing (RAN Coordination and routing) module 906, including ANR module 906a, RAN configuration module 908, and RAN proxying module 910. The ANR module 906a may perform the ANR tracking, PCI disambiguation, ECGI requesting, and GPS coalescing and tracking as described herein, in coordination with RAN coordination module 906 (e.g., for requesting ECGIs, etc.). In some embodiments, coordinating server 900 may coordinate multiple RANs using coordination module 906. In some embodiments, coordination server may also provide proxying, routing virtualization and RAN virtualization, via modules 910 and 908. In some embodiments, a downstream network interface 912 is provided for interfacing with the RANs, which may be a radio interface (e.g., LTE), and an upstream network interface 914 is provided for interfacing with the core network, which may be either a radio interface (e.g., LTE) or a wired interface (e.g., Ethernet).

Coordinator 900 includes local evolved packet core (EPC) module 920, for authenticating users, storing and caching priority profile information, and performing other EPC-dependent functions when no backhaul link is available. Local EPC 920 may include local HSS 922, local MME 924, local SGW 926, and local PGW 928, as well as other modules. Local EPC 920 may incorporate these modules as software modules, processes, or containers. Local EPC 920 may alternatively incorporate these modules as a small number of monolithic software processes. Modules 906, 908, 910 and local EPC 920 may each run on processor 902 or on another processor, or may be located within another device.

Although the above systems and methods are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever 3G and/or 4G is described, 5G could be managed in much the same way or in an equivalent or analogous way, for example, connections to 4G EPC PGWs or SGWs, or any other node for any other RAT, could be periodically evaluated for load and a SON-assisted inter-RAT handover to 5G may be evaluated and/or initiated by health and otherwise monitored, and the other aspects of the present disclosure could be made to apply, in a way that would be understood by one having skill in the art. Specifically with relation to 5G, an HNG or gateway can be provided in a 5G network between a 5G RAN and a 5G core, and can perform the same functions as described hereinabove with relation to LTE. The HNG can provide a network-initiated handover to a different RAT cell in the same geographic area, which may be a 5G gNodeB. The same architecture can be used for 5G standalone or non-standalone.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for Self Organizing Network (SON) Radio Access Technology (RAT) selection for User Equipment (UE) in a virtualized Radio Access Network (RAN) environment, the method comprising:
    establishing, by the UE, a Signaling Radio Bearer (SRB) and at least one Data Radio Bearer (DRB) with a Virtual base station node (Vnode) on a first RAT, the Vnode being a virtual machine hosted at a particular physical machine;
    determining, by a SON node in communication with the Vnode, whether the Vnode has reached a data plane saturation limit;
    when the Vnode has reached the data plane saturation limit, then determining whether there is a second Vnode providing service for a second RAT which can provide better data throughput, the second Vnode also being a virtual machine hosted at the particular physical machine; and
    when there exists the second Vnode which can provide better data throughput, then initiating a handover procedure for the UE and specifying a target cell located in a same geographic area as the Vnode on the first RAT.

2. The method of claim 1 wherein when the Vnode has not reached the data plane saturation limit then refraining from initiating a handover for the UE.

3. The method of claim 1 wherein when there does not exist the second Vnode which can provide better data throughput, then refraining from initiating a handover for the UE.

4. The method of claim 1 wherein the SON performs node configuration, monitors Key Performance Indicators (KPIs), and collects statistics related to the network.

5. The method of claim 1 wherein the SON detects when the UE connects to a RAT cell and also receives coverage from a different RAT cell based on a geographic neighbors list built by the SON or on a UE reported Inter-RAT neighbors list sent to the SON by a plurality of cells.

6. The method of claim 1 wherein the second Vnode has capacity to provide better throughput to the UE.

7. A telecommunications network, comprising:
    a Self Organizing Network (SON) service;
    a virtual base station node (Vnode) in communication with the SON and implemented at a hardware virtualization platform, providing a first radio access technology (RAT), the Vnode being a virtual machine hosted at a particular physical machine; and
    a radio network controller (VRNC) in communication with the SON service;
    wherein a Signaling Radio Bearer (SRB) and at least one Data Radio Bearer (DRB) is established by a UE with the Vnode;
    the SON service determines whether the Vnode has reached a data plane saturation limit;
    when the Vnode has reached the data plane saturation limit, then the Vnode determines whether there is a second Vnode providing a second radio access technology (RAT) which can provide better data throughput, the second Vnode also being a virtual machine hosted at the particular physical machine; and
    when there exists the second RAT Vnode which can provide better data throughput, then a handover procedure is initiated by the Vnode for the UE which specifies a target cell located in a same geographic area.

8. The telecommunications network of claim 7 wherein when the Vnode has not reached the data plane saturation limit then the Vnode refrains from initiating a handover for the UE.

9. The telecommunications network of claim 7 wherein when there does not exist the second Vnode which can provide better data throughput, then the Vnode refrains from initiating a handover for the UE.

10. The telecommunications network of claim 7 wherein the SON performs node configuration, monitors Key Performance Indicators (KPIs), and collects statistics related to the network.

11. The telecommunications network of claim 7 wherein the SON detects when the UE connects to a RAT cell and also receives coverage from a different RAT cell based on a geographic neighbors list built by the SON or on a UE reported Inter-RAT neighbors list sent to the SON by a plurality of cells.

12. The telecommunications network of claim 7 wherein the second Vnode has capacity to provide better throughput to the UE.

13. A non-transitory computer-readable medium containing instructions for a Self Organizing Network (SON) Radio Access Technology (RAT) selection for User Equipment (UE) in a virtualized Radio Access Network (RAN) environment which, when executed, causes a virtual node (Vnode) to perform steps comprising:

establishing, by a UE, a Signaling Radio Bearer (SRB) and at least one Data Radio Bearer (DRB) with a Virtual node (Vnode) on a first RAT, the Vnode being a virtual machine hosted at a particular physical machine;

determining, by a SON node in communication with the Vnode, whether the Vnode has reached a data plane saturation limit;

when the Vnode has reached the data plane saturation limit, then determining whether there is a second Vnode providing service for a second RAT which can provide better data throughput, the second Vnode also being a virtual machine hosted at the particular physical machine; and when there exists the second Vnode which can provide better data throughput, then initiating a handover procedure for the UE and specifying a target cell located in a same geographic area as the Vnode on the first RAT.

14. The non-transitory computer-readable medium of claim 13 further containing instructions wherein when the Vnode has not reached the data plane saturation limit then refraining from initiating a handover for the UE.

15. The non-transitory computer-readable medium of claim 13 further containing instructions wherein when there does not exist the second Vnode which can provide better data throughput, then refraining from initiating a handover for the UE.

16. The non-transitory computer-readable medium of claim 13 further containing instructions wherein the SON performs node configuration, monitors Key Performance Indicators (KPIs), and collects statistics related to the network.

17. The non-transitory computer-readable medium of claim 13 further containing instructions wherein the SON detects when the UE connects to a cell and also receives coverage from a different cell based on a geographic neighbors list built by the SON or on a UE reported Inter-RAT neighbors list sent to the SON by a plurality of cells.

18. The non-transitory computer-readable medium of claim 13 further containing instructions wherein the second Vnode has capacity to provide better throughput to the UE.

* * * * *